(12) United States Patent
Nishino et al.

(10) Patent No.: US 7,279,220 B2
(45) Date of Patent: Oct. 9, 2007

(54) HIGHLY FLAME-RETARDANT CROSS-LINKED ACRYLIC FIBER AND HIGHLY FLAME-RETARDANT COMPOSITE

(75) Inventors: Akio Nishino, Hofu (JP); Masahito Ohno, Hofu (JP)

(73) Assignee: Kaneka Corporation, Osaka (JP)

( * ) Notice: Subject to any disclaimer, the term of this patent is extended or adjusted under 35 U.S.C. 154(b) by 568 days.

(21) Appl. No.: 10/792,524

(22) Filed: Mar. 3, 2004

(65) Prior Publication Data

US 2005/0113501 A1    May 26, 2005

(30) Foreign Application Priority Data

Nov. 26, 2003    (JP)    ............... 2003-395130

(51) Int. Cl.
*D02G 3/00* (2006.01)
*B32B 27/00* (2006.01)
*C11D 3/00* (2006.01)

(52) U.S. Cl. ............... 428/364; 428/372; 428/375; 428/394; 8/115.51; 8/115.6

(58) Field of Classification Search ............... 428/364, 428/375, 394, 372; 8/115.6, 115.51; 524/144
See application file for complete search history.

(56) References Cited

U.S. PATENT DOCUMENTS

| | | | | |
|---|---|---|---|---|
| 2,949,437 A | * | 8/1960 | Hobson | ............... 525/203 |
| 3,582,258 A | * | 6/1971 | Coleman | ............... 8/115.58 |
| 4,007,232 A | * | 2/1977 | Yamazaki et al. | ........... 524/144 |
| 4,150,945 A | * | 4/1979 | Onizawa | ............... 8/115.6 |
| 4,409,350 A | | 10/1983 | Fujiwara et al. | |
| 5,278,234 A | * | 1/1994 | Nishino et al. | ............... 525/84 |

FOREIGN PATENT DOCUMENTS

| | | |
|---|---|---|
| JP | S51-82023 | 7/1976 |
| JP | S51-82024 | 7/1976 |
| JP | S57-89613 | 6/1982 |
| JP | 10-259542 | 9/1998 |
| JP | 2000-303306 | 10/2000 |
| WO | WO97/43474 | 11/1997 |

* cited by examiner

*Primary Examiner*—N. Edwards
(74) *Attorney, Agent, or Firm*—Kirschstein, et al.

(57) ABSTRACT

The highly flame-retardant acrylic fiber of the invention comprises 1 to 20 weight % of a glycidyl methacrylate polymer and 1 to 20 weight % of antimony oxide in an acrylonitrile copolymer obtained with use of monomers containing 20 to 70 weight % of at least one halogen-containing monomer, and can be cross-linked by heating. The cross-linked fiber and a highly flame-retardant composite produced with it are rarely ignited and difficult to be perforated with flame.

4 Claims, 1 Drawing Sheet

HIGHLY FLAME-RETARDANT CROSS-LINKED ACRYLIC FIBER AND HIGHLY FLAME-RETARDANT COMPOSITE

TECHNICAL FIELD

The present invention relates to a highly flame-retardant cross-linked acrylic fiber, which contains halogen, and a highly flame-retardant composite.

BACKGROUND

Conventionally, most of flame-retardant acrylic synthetic fibers have been Modacryl fibers. They show no great difference from usual acrylic fiber in the performances such as stiffness, bulkiness and dyeability of the product. The flame-retardancy of the flame-retardant acrylic fiber is lowered when made into spun or woven products by being mixed with various common fibers such as polyester, wool and cotton according to the purposes such as clothes, beddings such as blanket and sheet, or interior products such as curtain and carpet. Thus, a Modacryl fiber of higher flame retardancy is required along with recent flame-retardancy regulation. Conventionally, antimony trioxide, antimony pentoxide, tin oxide and magnesium oxide have been added to the spinning solution for the preparation of highly flame-retardant Modacryl fiber. By such a method, though flame-retardancy can be improved, flame can not be sufficiently intercepted as the cloth is perforated by flame or heat. For example, when the above-mentioned flame-retardant base cloth is used on the chair using polyurethane sponge, the base cloth is perforated by flame or heat and the polyurethane sponge is ignited.

Recently, trials have been made to improve conventional flame-retardancy by improving the decomposition temperature of the polymer or increasing the heat-contractility. Though conventional flame-resistant acrylic synthetic fiber becomes soft before burns and carbonizes gradually, it has problems such that it is perforated by combustion and heating.

For example, JP-H10-259542-A shows a flame-retardant fiber having a decomposition starting temperature not lower than 240° C. and a melting temperature not higher than 240° C. in which a Sb compound is added to a halogen-containing polymer. However, it has problems such that the flame-retardant acrylic fiber becomes soft before ignited and the cloth is perforated and it cannot intercept flame and thus the fire spreads continuously.

Also, JP-2000-303306-A shows that a copolymer having a specific viscosity not lower than 0.3 in which a Sn compound is added to a halogen-containing polymer is used. However, it has problems such that the flame-retardant acrylic fiber becomes soft before ignited and the cloth is perforated and it cannot intercept flame and thus the fire spreads continuously.

Further, WO97/43474 shows a composite flame-retardant fiber product using a fiber having a contraction rate not lower than 40% in which an Sb compound is added to a halogen-containing polymer. However, it has problems such that the flame retardancy is not improved and the flame-retardant acrylic fiber becomes soft before ignited and it cannot intercept flame and the cloth is perforated and thus the fire spreads continuously.

SUMMARY OF THE INVENTION

An object of the present invention is to provide a highly flame-retardant cross-linked acrylic fiber and highly flame-retardant composite by solving the above-mentioned problems, particularly to provide an acrylic fiber product, which is hard to be ignited and difficult to be perforated with flame.

The above-mentioned problems can be solved by incorporating a glycidyl methacrylate polymer and an antimony oxide in a flame retardant acrylic fiber.

The flame-retardant cross-linked acrylic fiber according to the present invention comprises 1 to 20 weight % of a glycidyl methacrylate polymer and 1 to 20 weight % of antimony oxide in an acrylonitrile copolymer obtained by using monomers containing 20 to 70 weight % of at least one halogen-containing monomer.

According to the present invention, it becomes possible to cross-link a flame-retardant acrylic fiber by heat and it can be used as a material in which the form after carbonized is rigid and it intercepts flame and further intercepts combustion.

DETAILED DESCRIPTION OF THE INVENTION

Figure 1:
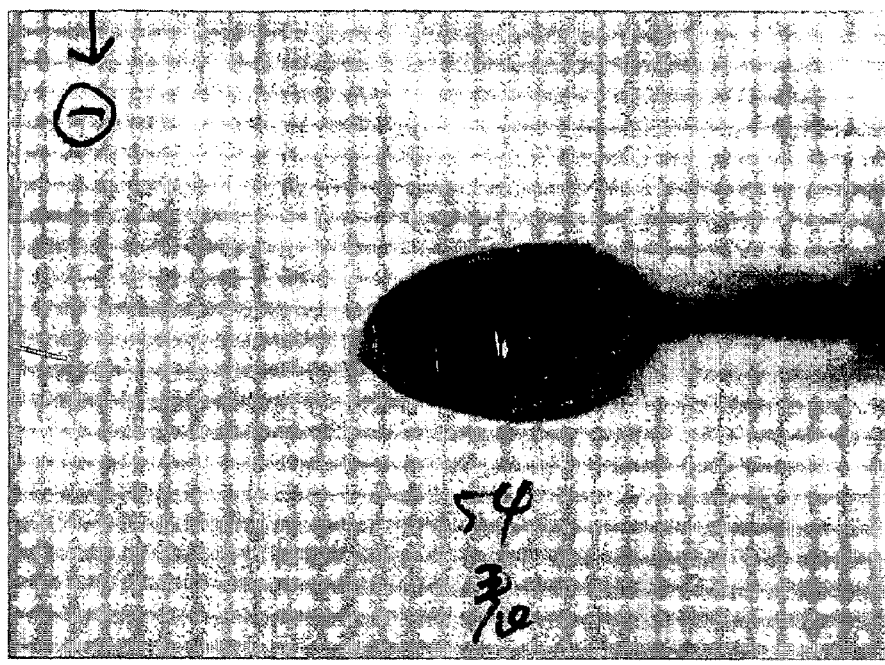
FIG. 1 is a photograph showing the carbonized part of the cloth obtained in Example 3 after the combustion test. It is hardly ignited and has combustion barrier property.
Figure 2:
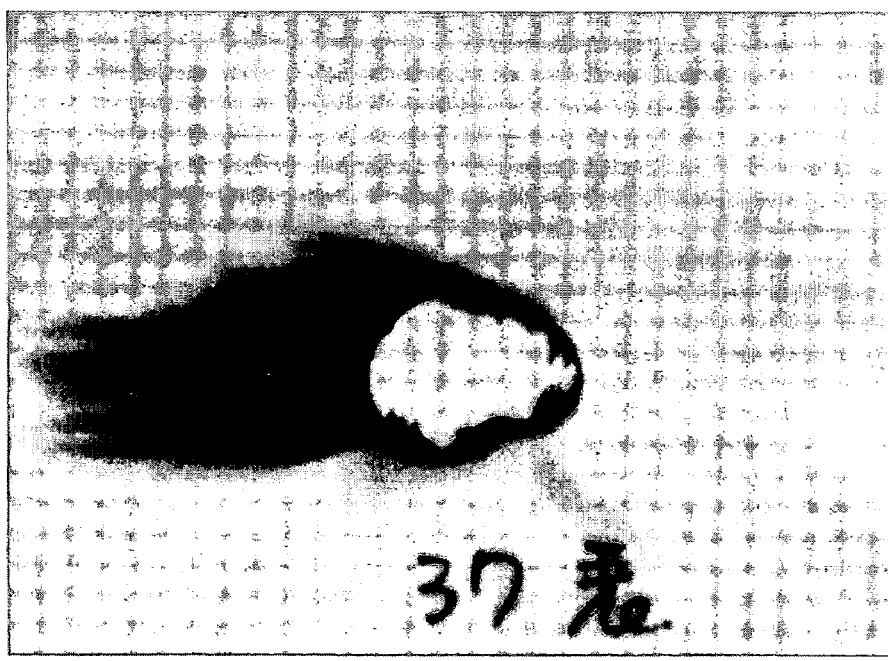
FIG. 2 is a photograph showing the carbonized part of the cloth obtained in Comparative Example 1 after the combustion test.

The present invention relates to a highly flame-retardant cross-linked acrylic fiber prepared by incorporating 1 to 20 weight % of a glycidyl methacrylate polymer and 1 to 20 weight % of antimony oxide in an acrylonitrile copolymer produced by using monomers containing 20 to 70 weight % of a halogen-containing monomer. Also, it relates to a highly flame-retardant composite prepared by compounding (A) 70 to 30 parts by weight of a highly flame-retardant cross-linked acrylic fiber prepared by incorporating 1 to 20 weight % of a glycidyl methacrylate polymer and 1 to 20 weight % of antimony oxide in an acrylonitrile copolymer produced by using monomers containing 20 to 70 weight % of a halogen-containing monomer and (B) 30 to 70 parts by weight of at least one other fiber.

The acrylonitrile copolymer used in the present invention is a copolymer produced by using acrylonitrile and a halogen-containing monomer. As the halogen-containing monomers, there are exemplified such as vinylidene chloride, vinyl chloride, vinylidene bromide, vinyl bromide and the like, and vinylidene chloride is preferably used. The preferred halogen content of the acrylonitril polymer used in the present invention is 15 to 50 weight % and the most preferred halogen content is 35 to 50 weight %. The content of the halogen-containing monomer in the acrylonitrile copolymer used in the present invention is 20 to 70 weight %. A content lower than 20 weight % gives insufficient flame-retardancy, while that higher than 70 weight % gives a high flame-retardancy but a low thermal resistance.

The acrylonitrile copolymer used in the present invention may be copolymers obtained by copolymerizing acrylonitrile and a halogen-containing monomer with at least one additional vinyl monomer such as acrylic acid, its ester, methacrylic acid, its ester, acrylamide, methacrylamide, vinylacetate and a monomer containing vinylsulfonic acid group. As the monomer containing a sulfonic acid group, exemplified are sodium allylsulfonate, sodium methallylsulfonate, sodium 2-acrylamido-2-methylpropanesulfonate and sodium styrenesulfonate. By copolymerizing the above additional vinyl monomer in an amount of 0.2 to 3 weight %, a fine fiber can be obtained preferably by inhibiting formation of minute voids in wet spinning.

As antimony oxide, preferred are antimony trioxide and antimony pentoxide. They can be used each alone or as their mixture. The amount of antimony oxide added is 1 to 20 weight %. A content of antimony oxide lower than 1 weight % makes flame-retardation of the fiber composite difficult, while that higher than 20 weight % causes problems in fiber-manufacturing process such as deterioration of physical properties (e.g. strength and elongation) of the fiber composite prepared, clogging of nozzles, clogging of filter cloth and breakage in elongation. A lower content of antimony oxide is better in the range satisfying flame retardancy. The added amount of antimony oxide is generally 1-10 weight %, and preferably 3-7 weight %.

The glycidyl methacrylate polymer may be a homopolymer of glycidyl methacrylate or a copolymer produced by copolymerizing glycidyl methacrylate and at least one of the other vinyl monomers such as an acrylic acid ester (e.g. methyl acrylate and ethyl acrylate), an alkyl methacrylate, an acrylamide, a methacrylamide, a N-monosubstituted or N,N-disubstituted acryl- or methacrylamide, vinyl acetate and the like. Particularly preferred are a homopolymer of glycidyl methacrylate and a copolymer of glycidyl methacrylate and methyl methacrylate.

The required content of the glycidyl methacrylate polymer is 1-20 weight %. A content lower than 1 weight % makes it difficult to produce a cloth which is not easily perforated by flame. On the other hand higher than 20 weight % gives a high viscosity of the spinning solution after the glycidyl methacrylate polymer is added and increases a tendency of gelation of the spinning soluition. Generally the used amount of the glycidyl methacrylate polymer is 2-15 weight %, preferably 3-12 weight % and more preferably 5-10 weight %. The glycidyl methacrylate polymer is preferably a glycidyl methacrylate homopolymer or a copolymer with methyl methacrylate and particularly preferred is a copolymer containing at least 50 weight % of glycidyl methacrylate.

The highly flame-retardant acrylic fiber according to the present invention can be easily thermally cross-linked by glycidyl methacrylate and becomes difficult to be dissolved in dimethylformamide as cross-linking proceeds. At least 50 weight % of the highly flame-retardant acrylic fiber is insoluble in dimethylformamide after heated at 150° C. and preferably completely insoluble in dimethylformamide. The DMF insolubility rate shown by the equation given below is a criterion for cross-linking. It is affected by the drying condition in the manufacturing process. Though it does not matter if the highly flame-retardant acrylic fiber is soluble in DMF before heated, the cross-linking shall proceed by being heated at 150° C. to cross-link by heating in combustion and to inhibit softening of the fiber. When a homopolymer of glycidyl methacrylate is used, cross-linking is easily occurred, and compatibility with acrylonitrile copolymer is good, and a phase separation in microscopic order cannot be observed. On the other hand, a solution of a homopolymer of glycidyl methacrylate tends to easily gel by heat and is low in stability. The stability can be improved by a copolymer with methyl methacrylate.

As the other fiber (B) used by mixing the highly flame-retardant cross-linked acrylic fiber (A), there are exemplified synthetic fibers such as acrylic fiber, polyester fiber, nylon fiber and polyurethane fiber, natural fibers such as cotton, wool, hemp and silk, and regenerated fibers such as rayon fiber and acetate fiber. The other fiber may be used alone or as a combination of two or more.

The method for manufacturing the acrylic flame-retardant composite fiber product according to the present invention may be a general mixing method such as fiber blending, mix spinning, mixed weaving and mixed knitting. The form of fiber product may be padding, yarn, string, knitted good, woven good, nonwoven fabric, raising good and flocked good and is not especially restricted to them. However, particularly preferred composite form is mixed weaving.

In the present invention, the mixing ratio of the highly flame-retardant cross-linked acrylic fiber (A) to the other fiber (B) is decided in accordance with the characteristics of the final product prepared from the highly flame-retardant composite, such as flame retardancy, feeling, strength, color developing property and hygroscopicity. However, preferred is 70 to 30 parts by weight of the highly flame-retardant cross-linked acrylic fiber (A) and 30 to 70 parts by weight of the other fiber (B). The highly flame-retardant cross-linked acrylic fiber (A) less than 30 parts by weight gives insufficient flame retardancy, while that more than 70 parts by weight gives excellent flame retardancy but gives insufficient feeling and hygroscopicity. The other fiber making the most of the improvement in combustibility of the present invention is polyester. A highly flame retardancy is required particularly to mixed weaving with polyester and the hurdle is very high. Polyester is molten by heat in combustion and, when ignited, combustion is continued by so-called candle phenomenon even if the flame retardant acrylic fiber does not burn. The highly flame retardant cross-linked acrylic fiber of the present invention is high in carbonization strength and the carbonized form is firm and hence intercept flame and is rarely to be ignited and is difficult to be the core of the candle and thus is difficult to cause candle phenomenon.

EXAMPLES

The following examples serve to illustrate in more detail although the invention is not limited to the examples. Unless otherwise indicated, % signifies % by weight.

In the examples, insolubility to dimethylformamide (abbreviated to DMF hereinafter), combustion barrier property and poorness of yarn division of the highly flame retardant acrylic fiber were derived by the following procedures.

[DMF Insoluble Rate]

The highly flame retardant acrylic fiber was treated by heating at 150° C. for 5 minutes and 0.2 g of the treated fiber was dissolved in 50 g of DMF at room temperature for 2 hours and well mixed. Then the insoluble matter was precipitated and a glass nonwoven fabric was impregnated with the supernatant liquid and dried at 150° C. for 1 hour. The increased of weight was measured to calculate the solid amount. The insoluble rate was calculated from the concentration of the solution part by the following equation.

DMF insoluble rate (%)=[0.4(%)−solid (%)]/0.4×100

[Evaluation of Combustion Barrier Property]

The combustion barrier property of the fabric was evaluated by a procedure in which the sample was burnt according to the combustion test method JIS L 1091 A-1 (45 degrees sag method) in which the combustion was made from four directions of warp, weft, upper and lower sides and the total average of the lengths of perforations of the carbonized parts in the burning direction was calculated as the combustion barrier property. When even one sheet was totally burnt, it was defined to fail in combustion.

○: The length of perforation is not more than 2 mm.

Δ: The length of perforation is 2 to less than 20 mm.

×: The length of perforation is not less than 20 mm.

[Poorness of Yarn Division]

Poorness of yarn division was measured by counting the number of poor openings in 300 mm flat card of 16 g cut fibers.

Examples 1 to 5, Comparative Examples 1 to 3

Acrylonitrile (abbreviated to "AN" hereinafter), vinylidene chloride (abbreviated to "VDC" hereinafter) and 2-acrylamide-2-methylpropanesulfonate (abbreviated to "SAM" hereinafter) were copolymerized in a weight ratio of 69:16:15 in DMF by using azobisisovaleronitrile as the initiator to obtain an acrylonitrile copolymer SR. Further, AN and VDC were copolymerized in a weight ratio of 58:42 in DMF by using azobisisovaleronitrile as the initiator in the state of that the above acrylonitrile copolymer SR was added in the copolymerizing system in an amount of 10% based on the total polymer. After removing the residual monomers, the polymer concentration was adjusted to 29% to give a spinning solution.

25% DMF solution of a copolymer of glycidyl methacrylate (abbreviated to "GMA" hereinafter)/methyl methacrylate (abbreviated to "MMA" hereinafter)=75/25 and 25% dispersion of antimony pentoxide were added to the spinning solution in amounts shown in Table 1 and then the spinning solution was spun into 58% aqueous DMF solution at 22° C. and elongated while removing the solvent and washed with water and then oiled and dried and treated to produce a dry dense fiber.

The fiber was passed through each processes of crimping and then wet-heated at 100° C. and cut to 51 mm to give a highly flame-retardant cross-linked acrylic fiber of 2.2 dtex. The cut fiber was spun at yarn number 17. A plain weave fabric was prepared by using 130 yarns/inch of polyester wooly 150 dtex and 60 yarns/inch of the above spun yarn as the warp. The results are shown in Table 1.

The DMF insolubility rates of the highly flame-retardant cross-linked acrylic fibers of Examples 1 to 5 were as high as not less than 73%. The fibers were rarely ignited. They immediately extinguish a fire and were good in combustion barrier property. Though poor yarn division was slightly observed in Example 5, spinning could be performed with no hindrance. However, in Comparative Examples 1 and 2, the DMF insolubility rate was not more than 37% and no combustion barrier property was observed. In Comparative Example 3, poorness of yarn division was as high as not less than 100 and spinning property was highly deteriorated.

Examples 6 to 8, Comparative Example 4

Antimony pentoxide and a GMA homopolymer or a copolymer of GMA/MMA=75/25~30/70 were added to the spinning solution of the acrylonitrile copolymer of Example 1 in amounts shown in Table 2 and the mixture was spun, elongated, washed with water, oiled, dried, crimped, wet-heated and cut in the same manner as in Example 1 to give 2.2 dtex highly flame-retardant cross-linked acrylic fibers. The cut fibers were spun in the same manner as in Example 1 to prepare plain weaves. These results are shown in Table 2.

TABLE 2

| | GMA monomer (%) | MMA monomer (%) | GMA polymer (%) | $Sb_2O_5$ (%) | Poorness of yarn division (number/16 g) | DMF insoluble rate (%) | Combustion barrier property | Remarks |
|---|---|---|---|---|---|---|---|---|
| Example 6 | 100 | 0 | 5.0 | 5.1 | 0 | 100 | ○ | |
| Example 7 | 75 | 25 | 6.7 | 5.1 | 0 | 100 | ○ | |
| Example 8 | 50 | 50 | 10.0 | 5.1 | 2 | 90 | ○ | |
| Comp. Ex. 4 | 30 | 70 | 25.0 | 5.1 | — | — | — | Glued in drying |

TABLE 1

| | GMA Polymer (%) | $Sb_2O_5$ (%) | Poorness of yarn division*1 (number/16 g) | DMF insoluble rate*2 (%) | Combustion barrier property*3 |
|---|---|---|---|---|---|
| Comp. Example 1 | 0.0 | 5.5 | 0 | 0 | X |
| Comp. Example 2 | 0.5 | 5.5 | 0 | 37 | X |
| Example 1 | 1.0 | 5.5 | 0 | 73 | ○ |
| Example 2 | 2.0 | 5.5 | 0 | 100 | ○ |
| Example 3 | 5.0 | 5.5 | 0 | 100 | ○ |
| Example 4 | 10.0 | 5.5 | 0 | 100 | ○ |
| Example 5 | 20.0 | 5.5 | 2 | 100 | ○ |
| Comp. Example 3 | 30.0 | 5.5 | ≧100 | 100 | ○ |

*1Number of poor yarn division at 300 mm card.
*2 0.2 g of the fiber is dissolved in 50 g DMF at room temperature and measured.
*3 ○: The length of perforation is not more than 2 mm.
Δ: The length of perforation is 2 to less than 20 mm.
X: The length of perforation is not less than 20 mm.

The DMF insoluble rates of the highly flame-retardant cross-linked acrylic fiber of Examples 6 to 8 were as high as not less than 90%. The fibers were rarely ignited. They immediately extinguished a fire and were good in combustion barrier property. However, in Comparative Example 4, fibers were glued in drying process to give no sample.

Examples 9 to 11, Comparative Examples 5 to 9

AN and VDC were copolymerized in a weight ratio shown in Table 3 in the presence of the acrylonitrile copolymer SR in the same manner as Example 1 and the residual monomers were removed and then the polymer concentration was adjusted to 29% to give spinning solutions. Then, antimony pentoxide and a copolymer of GMA/MMA=75/25 were added in amounts shown in Table 3 to the spinning solutions and spun, extended, washed with water, oiled, dried, crimped, wet-heated and cut in the same manner as in Example 1 to give 2.2 dtex highly flame-retardant cross-linked acrylic fibers. The cut fibers were spun in the same manner as in Example 1 to give plain weaves. These results are shown in Table 3.

TABLE 3

|  | AN/VDC | GMA-Polymer (%) | Sb₂O₅ (%) | Poorness of yarn division (number/16 g) | DMF insoluble rate (%) | Combustion barrier property | Remarks |
| --- | --- | --- | --- | --- | --- | --- | --- |
| Comp. Ex. 5 | 58/42 | 5.1 | 0.0 | 0 | 100 | — | Burnt down |
| Comp. Ex. 6 | 58/42 | 5.1 | 0.5 | 0 | 100 | — | Burnt down |
| Example 9 | 58/42 | 5.1 | 1.0 | 0 | 100 | ○ | |
| Example 10 | 30/70 | 5.1 | 10.0 | 0 | 100 | ○ | |
| Example 11 | 80/20 | 5.1 | 20.0 | 0 | 100 | ○ | |
| Comp. Ex. 7 | 85/15 | 5.1 | 3.0 | 0 | 100 | — | Burnt down |
| Comp. Ex. 8 | 25/75 | 5.1 | 3.0 | — | — | — | Glued in drying |
| Comp. Ex. 9 | 60/40 | 5.1 | 30.0 | — | — | — | Highly end down |

The DMF insoluble rates of the highly flame-retardant cross-linked acrylic fibers of Examples 6 to 8 were as high as not less than 100%. The fibers were rarely ignited. They immediately extinguished a fire and were good in combustion barrier property. However, the fibers of Comparative Examples 5 to 7 were burnt down and thus their flame retardancy was poor. In Comparative Example 8, the fibers were glued in drying process. Comparative Example 9 showed high end down to give no sample.

The present invention is especially suitable for use in mixing with polyester and the field of chair covering.

What is claimed is:

1. A highly flame-retardant cross-linked acrylic fiber, comprising: a composition of 1 to 20 weight % of a glycidyl methacrylate polymer and 1 to 20 weight % of antimony oxide in an acrylonitrile copolymer produced by using monomers containing 20 to 70 weight % of at least one halogen-containing monomer, said glycidyl methacrylate polymer being a copolymer of glycidyl methacrylate and methyl methacrylate.

2. The highly flame-retardant cross-linked acrylic fiber according to claim 1, in which said glycidyl methacrylate polymer is a copolymer produced by using at least 50 weight % of glycidyl methacrylate.

3. The highly flame-retardant cross-linked acrylic fiber according to claim 1, in which said halogen-containing monomer is vinylidene chloride.

4. The highly flame-retardant cross-linked acrylic fiber according to claim 1, in which at least 50 weight % of said flame-retardant cross-linked acrylic fiber is insoluble in dimethylformamide after heating at 150° C.

* * * * *